*(12)* United States Patent
Kayal

(10) Patent No.: US 12,105,396 B2
(45) Date of Patent: Oct. 1, 2024

(54) ELECTRO-OPTIC DEVICE COMPRISING INTEGRATED CONDUCTIVE EDGE SEAL AND A METHOD OF PRODUCTION OF THE SAME

(71) Applicant: E INK CORPORATION, Billerica, MA (US)

(72) Inventor: Matthew Joseph Kayal, Franklin, MA (US)

(73) Assignee: E Ink Corporation, Billerica, MA (US)

( * ) Notice: Subject to any disclaimer, the term of this patent is extended or adjusted under 35 U.S.C. 154(b) by 394 days.

(21) Appl. No.: 17/363,096

(22) Filed: Jun. 30, 2021

(65) Prior Publication Data

US 2022/0026775 A1   Jan. 27, 2022

Related U.S. Application Data

(60) Provisional application No. 63/054,865, filed on Jul. 22, 2020.

(51) Int. Cl.
*G02F 1/167* (2019.01)
*G02F 1/16757* (2019.01)
(Continued)

(52) U.S. Cl.
CPC .......... *G02F 1/167* (2013.01); *G02F 1/16757* (2019.01); *G02F 1/1676* (2019.01);
(Continued)

(58) Field of Classification Search
CPC ............. G02F 1/167; G02F 2001/1678; G02F 1/16757; G02F 1/1681; G02F 1/1676; G02F 2202/28; G02F 2202/022; G02F 1/1675; G02F 1/1677; G02F 1/1347; G02F 1/1685; G02F 2201/16; G02F 2203/30; G02F 2203/34; G02F 1/13439; G02F 1/0107; G02F 1/1309; G02F 1/133305;
(Continued)

(56) References Cited

U.S. PATENT DOCUMENTS 5,760,761 A   6/1998 Sheridon
5,777,782 A   7/1998 Sheridon
(Continued)

FOREIGN PATENT DOCUMENTS

EP   1462847 A1   9/2004
JP   2007133202 A   5/2007
(Continued)

OTHER PUBLICATIONS

Korean Intellectual Property Office, "International Search Report and Written Opinion", PCT/US2021/039760, Oct. 8, 2021.
(Continued)

*Primary Examiner* — Brandi N Thomas
(74) *Attorney, Agent, or Firm* — Ioannis Constantinides

(57) ABSTRACT

Improved electro-optic devices are disclosed comprising an electrophoretic material layer comprising electrophoretic medium disposed between electrodes, and a conductive edge seal. The conductive edge seal is not only used to prevent ingress of moisture in the device, but also to electrically connect the electrodes. An improved method of producing an electro-optic device having conductive edge seal is also disclosed.

9 Claims, 12 Drawing Sheets

(51) Int. Cl.
*G02F 1/1676* (2019.01)
*G02F 1/1679* (2019.01)
*G02F 1/1675* (2019.01)

(52) U.S. Cl.
CPC .... *G02F 1/1679* (2019.01); *G02F 2001/1678* (2013.01); *G02F 2202/022* (2013.01)

(58) Field of Classification Search
CPC ........ G02F 1/133308; G02F 1/133331; G02F 1/133514; G02F 1/1673; G02F 1/1679; G02F 2202/04; G02F 1/1303; G02F 1/1306; G02F 1/133553; G02F 1/16756; G02F 2203/01; G02F 1/0027; G02F 1/0115; G02F 1/0128; G02F 1/1333; G02F 1/133302; G02F 1/133377; G02F 1/13338; G02F 1/133394; G02F 1/1334; G02F 1/133509; G02F 1/133562; G02F 1/133614; G02F 1/133616; G02F 1/133621; G02F 1/1339; G02F 1/13394; G02F 1/13396; G02F 1/13398; G02F 1/1341; G02F 1/1343; G02F 1/134363; G02F 1/136213; G02F 1/136254; G02F 1/16755; G02F 1/16761; G02F 1/3558; G02F 2201/123; G02F 2201/56; G02F 2202/02; G02F 2203/02; G02F 2203/69; G09G 3/344; G09G 2320/0233; G09G 3/2003; G09G 2230/00; G09G 2300/0852; G09G 2310/06; G09G 2320/0242; G09G 2320/0285; G09G 2320/041; G09G 2320/0653; G09G 2320/0666; G09G 2330/021; G09G 2340/06; G09G 2380/14; G09G 3/2096

See application file for complete search history.

(56) References Cited

U.S. PATENT DOCUMENTS

| | | |
|---|---|---|
| 5,808,783 A | 9/1998 | Crowley |
| 6,054,071 A | 4/2000 | Mikkelsen, Jr. |
| 6,055,091 A | 4/2000 | Sheridon |
| 6,097,531 A | 8/2000 | Sheridon |
| 6,128,124 A | 10/2000 | Silverman |
| 6,137,467 A | 10/2000 | Sheridon et al. |
| 6,147,791 A | 11/2000 | Sheridon |
| 6,239,898 B1 | 5/2001 | Byker et al. |
| 6,241,921 B1 | 6/2001 | Jacobson et al. |
| 6,665,107 B2 | 12/2003 | Forgette et al. |
| 6,672,921 B1 | 1/2004 | Liang et al. |
| 6,788,449 B2 | 9/2004 | Liang et al. |
| 6,866,760 B2 | 3/2005 | Paolini Jr. et al. |
| 6,888,606 B2 | 5/2005 | Hinata et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,064,882 B2 | 6/2006 | Tonar et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,112,114 B2 | 9/2006 | Liang et al. |
| 7,116,318 B2 | 10/2006 | Amundson et al. |
| 7,144,942 B2 | 12/2006 | Zang et al. |
| 7,170,670 B2 | 1/2007 | Webber |
| 7,236,291 B2 | 6/2007 | Kaga et al. |
| 7,298,356 B2 | 11/2007 | Murade |
| 7,312,784 B2 | 12/2007 | Baucom et al. |
| 7,321,459 B2 | 1/2008 | Masuda et al. |
| 7,369,299 B2 | 5/2008 | Sakurai et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,495,819 B2 | 2/2009 | Sakurai et al. |
| 7,525,719 B2 | 4/2009 | Yakushiji et al. |
| 7,535,624 B2 | 5/2009 | Amundson et al. |
| 7,551,345 B2 | 6/2009 | Uchida |
| 7,554,712 B2 | 6/2009 | Patry et al. |
| 7,561,324 B2 | 7/2009 | Duthaler et al. |
| 7,615,325 B2 | 11/2009 | Liang et al. |
| 7,646,530 B2 | 1/2010 | Takagi et al. |
| 7,649,674 B2 | 1/2010 | Danner et al. |
| 7,679,814 B2 | 3/2010 | Paolini, Jr. et al. |
| 7,705,823 B2 | 4/2010 | Nihei et al. |
| 7,715,088 B2 | 5/2010 | Liang et al. |
| 7,733,554 B2 | 6/2010 | Danner et al. |
| 7,791,782 B2 | 9/2010 | Paolini, Jr. et al. |
| 7,839,564 B2 | 11/2010 | Whitesides et al. |
| 8,009,348 B2 | 8/2011 | Zehner et al. |
| 8,034,209 B2 | 10/2011 | Danner et al. |
| 8,436,968 B2 | 5/2013 | Lin et al. |
| 8,610,988 B2 | 12/2013 | Zehner et al. |
| 8,848,388 B2 | 9/2014 | Sato |
| 9,279,906 B2 | 3/2016 | Kang |
| 9,470,950 B2 | 10/2016 | Paolini, Jr. et al. |
| 9,835,925 B1 | 12/2017 | Bull et al. |
| 10,444,553 B2 | 10/2019 | Laxton |
| 2006/0087479 A1 | 4/2006 | Sakurai et al. |
| 2006/0087489 A1 | 4/2006 | Sakurai et al. |
| 2006/0209008 A1 | 9/2006 | Nihei et al. |
| 2006/0214906 A1* | 9/2006 | Kobayashi ........ G02F 1/134336 345/107 |
| 2015/0005720 A1* | 1/2015 | Zang ...................... A61Q 19/00 604/289 |
| 2016/0012710 A1 | 1/2016 | Lu et al. |

FOREIGN PATENT DOCUMENTS

| | | |
|---|---|---|
| JP | 2015158621 A | 9/2015 |
| KR | 20110015321 A | 2/2011 |
| KR | 101401117 B1 | 5/2014 |
| KR | 20170112366 A | 3/2016 |
| KR | 20170112543 A | 10/2017 |
| WO | 2004079442 A1 | 9/2004 |
| WO | 2011108307 A1 | 9/2011 |

OTHER PUBLICATIONS

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

European Patent Office, "Extended European Search Report", EP Appl. No. 21846686.0, Jun. 21, 2024.

* cited by examiner

101

ELECTRO-OPTIC DEVICE COMPRISING INTEGRATED CONDUCTIVE EDGE SEAL AND A METHOD OF PRODUCTION OF THE SAME

RELATED APPLICATIONS

This application claims priority to U.S. Provisional Patent Application No. 63/054,865 filed on Jul. 22, 2020, which is incorporated by reference in its entirety, along with all other patents and patent applications disclosed herein.

BACKGROUND OF INVENTION

This invention relates to electro-optic and related devices and to methods for producing such devices. This invention is particularly, but not exclusively, intended for displays comprising electrophoretic media. The invention can also be used for various other types of electro-optic media which are solid, in the sense that they have solid external surfaces, although the media may have internal cavities which contain a fluid, either liquid or gas. Thus, the term "solid electro-optic displays" includes encapsulated electrophoretic displays, encapsulated liquid crystal displays, and other types of devices.

The term "electro-optic", as applied to a material or a display or a device, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying the sections of the bodies that are seen through a viewing surface. This type of electro-optic medium is typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500, 971; 1,501,194; 1,536,271; 1,542,067; 1,577,702; 1,577, 703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous microcapsules, each of which itself comprises an internal phase containing electrophoretically-mobile particles in a fluid medium, and a capsule wall surrounding the internal phase. Typically, the microcapsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Microcapsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,075,703, 7,116,318, 7,535,624, 7,554,712, 7,561,324, 7,649,674, 7,733,554, 8,034,209, 8,610,988, and 9,835,925;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication No. 2015/0277160; and applications of encapsulation and microcell technology other than displays; see for example U.S. Pat. No. 7,615,325 and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

An encapsulated or microcell electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques. Thus, the resulting display can be flexible. Further, because the display medium can be printed (using a variety of methods), the display itself can be made inexpensively.

An electro-optic display normally comprises an electro-optic material layer and at least two other layers disposed on opposed sides of the electro-optic material layer, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic material layer comprises an electrode, the layer on the opposed side of the electro-optic layer typically being a protective layer intended to prevent the movable electrode damaging the electro-optic material layer.

The aforementioned U.S. Pat. No. 6,982,178 also describes methods for forming an electrical connection between a light-transmissive electrode layer and a backplane. As illustrated in FIGS. 8 and 9 of U.S. Pat. No. 6,982,178, the connection is achieved by the creation of an aperture through the electro-optic material layer and filling the aperture with a conductive material to form a conductive via. This methodology is undesirable from a manufacturing point of view, since the location of the conductive via is a function of the backplane design, so that a precursor assembly having a specific architecture can only be used with one, or a limited range of backplanes. Furthermore, the conductive via methodology reduces the effective area of the electro-optic material layer and, as a result, reduces the active area of the electro-optic device itself.

Accordingly, the aforementioned U.S. Pat. No. 6,982,178 also describes methods for forming the necessary electrical connections by coating electro-optic medium over the whole area of the FPL and then removing the electro-optic medium where it is desired to form electrical connections. However, such removal of electro-optic medium poses its own problems. Typically, the electro-optic medium must be removed by the use of solvents or mechanical cleaning, either of which may result in damage to, or removal of, the electrically-conductive layer of the FPL (this electrically-conductive layer usually being a layer of a metal oxide, for example indium tin oxide, less than 1 µm thick), causing a failed electrical connection. In extreme cases, damage may also be caused to the front substrate (typically a polymeric film) which is used to support and mechanically protect the conductive layer. In some cases, the materials from which the electro-optic medium is formed may not be easily solvated, and it may not be possible to remove them without the use of aggressive solvents and/or high mechanical pressures, either of which will exacerbate the aforementioned problems.

Accordingly, there is thus a need for improved methods of forming electrical connections between the electrodes of electro-optic devices, and similar devices, and the present invention seeks to provide such improved methods.

SUMMARY OF THE INVENTION

In one aspect, the present invention provides an electro-optic device having an active display area and comprising a first light-transmissive electrode layer, an electrophoretic material layer, a backplane comprising a second electrode layer, and a conductive edge seal. The first light-transmissive electrode layer has an upper surface, a lower surface, and a peripheral surface, and comprises a first electrode contact location. The upper surface of the first light-transmissive layer has a length and a width. The electrophoretic material layer has an upper surface, a lower surface, and a peripheral surface. The upper surface of the electrophoretic material layer is defined by a perimeter that has a length and a width. The backplane comprises a second electrode layer, wherein the second electrode layer comprises a second electrode contact location. The backplane has an upper surface, a lower surface, and a peripheral surface. The upper surface of the backplane has a length and a width. The electrophoretic material layer comprises an electrophoretic medium. The upper surface of the electrophoretic material layer is in contact with the lower surface of the first light-transmissive electrode layer. The lower surface of the electrophoretic material layer is in contact with the backplane. The conductive edge seal is disposed on the peripheral surfaces of the electrophoretic material layer and the first light-transmissive electrode layer. The conductive edge seal electrically connects the first light-transmissive electrode at the first electrode contact location and the second electrode layer at the second electrode contact location. At least part of the first electrode contact location and at least part of the second electrode contact location are outside the volume defined by the vertical extension of the perimeter of the upper surface of the electrophoretic material layer. This results in the active display area of the device being substantially the same as the area of the upper surface of the electrophoretic material layer. The electrophoretic medium may comprise electrophoretic particles in a non-polar liquid. The electrophoretic medium may be compartmentalized in microcapsules or microcells. The conductive edge seal is formed by an edge seal composition. The edge seal composition may comprise conductive particles selected form the group consisting of carbon black particles, graphite, carbon nanotubes, metal particles, and mixtures thereof. The edge seal composition may comprise a conductive polymer. The resistivity of the conductive edge seal may be less than 10 kOhm·cm.

In another aspect, the present invention provides an electro-optic device having an active display area and comprising a first light-transmissive electrode layer, a second adhesive layer, an electrophoretic material layer, a first adhesive layer, a backplane comprising a second electrode layer, and a conductive edge seal. The first light-transmissive electrode layer has an upper surface, a lower surface, and a peripheral surface, and comprises a first electrode contact location. The upper surface of the first light-transmissive surface has a length and a width. The first adhesive layer has an upper surface, a lower surface, and a peripheral surface. The upper surface of the first adhesive layer has a length and a width. The electrophoretic material layer has an upper surface, a lower surface, and a peripheral surface. The upper surface of the electrophoretic material layer is defined by a perimeter that has a length and a width. The second adhesive layer has an upper surface, a lower surface, and a peripheral surface. The upper surface of the second adhesive layer has a length and a width. The backplane comprises a second electrode layer, wherein the second electrode layer comprises a second electrode contact location. The backplane has an upper surface, a lower surface, and a peripheral surface. The upper surface of the backplane has a length and a width. The upper surface of the second adhesive layer is in contact with lower surface of the first light-transmissive layer and the lower surface of the second adhesive layer is in contact with the upper surface of the electrophoretic material layer. The upper surface of the first adhesive layer is in contact with the lower surface of the electrophoretic material layer. The lower surface of the first adhesive composition is in contact with the upper surface of the backplane. The electrophoretic material layer comprises an electrophoretic medium. The length and width of the upper surface of the first light-transmissive electrode layer and the length and width of the upper surface of the backplane are larger than the length and width of the perimeter of the upper surface of the electrophoretic material layer, the length and width of the upper surface of the first adhesive layers, and the length and width of the upper surface of the second adhesive layer. The first light-transmissive electrode layer and the backplane extend outwardly beyond the edges of the perimeter of the upper surface of the electrophoretic material layer and the edges of the first and the second adhesive layers, forming a groove. The groove is defined by the outwardly extended first light-transmissive electrode layer, the peripheral surface of the second adhesive layer, the peripheral surface of the electrophoretic material layer, the peripheral surface of the first adhesive layer, and the outwardly extended backplane. The groove is filled with the conductive edge seal.

In another aspect, the present invention provides a process for producing an electro-optic device, the process comprising the steps: (1) providing a sub-assembly comprising (a) an electrophoretic material layer comprising an electrophoretic medium and having an upper surface, a lower surface, and a peripheral surface, wherein the upper surface of the electrophoretic material layer is defined by a perimeter having a length and a width, (b) a first adhesive layer having an upper surface, a lower surface, and a peripheral surface, wherein the upper surface of the first adhesive layer has a length and width, wherein the upper surface of the first adhesive layer is in contact with the lower surface of the electrophoretic material layer, (c) a first release sheet disposed on the lower surface of the first adhesive layer, (d) a second adhesive layer having an upper surface, a lower surface, and a peripheral surface, wherein the upper surface of the second adhesive surface has a length and a width, wherein the lower surface of the second adhesive layer is in contact with the upper surface of the electrophoretic material layer, (e) a second release sheet disposed on the upper surface of the second adhesive layer; (2) removing the first release sheet and contacting the exposed lower surface of the first adhesive layer with a backplane, wherein the backplane comprises a second electrode layer, wherein the backplane has an upper surface, a lower surface, and a peripheral surface, wherein the upper surface of the backplane has a length and a width, and wherein the upper surface of the backplane is in contact with the lower surface of the first adhesive layer, wherein the second electrode layer comprises a second electrode contact location, wherein at least part of the second electrode contact location is outside the volume defined by the vertical extension of the perimeter of the upper surface of the electrophoretic material layer, and wherein the backplane has length and width that are larger than the length and width of the perimeter of the electrophoretic material layer and the length and width of the first adhesive layer, and wherein the backplane extends outwardly beyond the edges of the perimeter of the upper surface of the electrophoretic material layer and the edges of the first adhesive layer; (3) removing the second release sheet and contacting the exposed upper surface of the second adhesive layer with a first light-transmissive electrode layer, wherein the first light-transmissive electrode layer comprises a first electrode contact location, wherein at least part of the first electrode contact location is outside the volume defined by the vertical extension of the perimeter of the upper surface of the electrophoretic material layer, wherein the first light-transmissive electrode layer has an upper surface, a lower surface, and a peripheral surface, wherein the upper surface of the first light-transmissive electrode has a length and a width that are larger than the length and width of the perimeter of the upper surface of the electrophoretic material layer, the length and width of the first adhesive layer and the length and width of the second adhesive layer, wherein the lower surface of the first light-transmissive layer is in contact with the upper surface of the second adhesive layer, and wherein the first light-transmissive electrode layer extends outwardly beyond the edges of the perimeter of the upper surface of the electrophoretic material layer and the edges of the first and second adhesive layers, and wherein a groove is formed that is defined by the outwardly extended first light-transmissive electrode layer, the peripheral surface of the first adhesive layer, the peripheral surface of the electrophoretic material layer, the peripheral surface of the second adhesive layer and the outwardly extended backplane; (4) disposing an edge seal composition inside the groove (5) curing the edge seal composition to form a conductive edge seal, wherein the conductive edge seal contacts the first light-transmissive electrode layer at the first electrode contact location and the conductive edge seal contacts the second electrode layer at the second electrode contact location. The peel force to remove the second release sheet may be lower than the peel force to remove the first release sheet.

In another aspect, the present invention provides a process of producing an electro-optic device comprising the steps: (1) providing a sub-assembly comprising (a) a first light-transmissive electrode layer having an upper surface, a lower surface, and a peripheral surface, and wherein the first light-transmissive electrode comprises a first electrode contact location (b) an electrophoretic material layer comprising an electrophoretic medium and having an upper surface, a lower surface, and a peripheral surface, wherein the upper surface of the electrophoretic material layer is in contact with the lower surface of the first light-transmissive electrode layer, wherein the upper surface of the electrophoretic material layer is defined by a perimeter, and wherein at least part of the first electrode contact location is outside the volume defined by the vertical extension of the perimeter of the upper surface of the electrophoretic material layer, (c) a first adhesive layer having an upper surface, a lower surface, and a peripheral surface, and wherein the upper surface of the first adhesive layer is in contact with the lower surface of the electrophoretic medium layer, (d) a first release sheet, wherein the first release sheet is in contact with the lower surface of the first adhesive layer; (2) removing the first release sheet and contacting the exposed lower surface of the first adhesive layer with a backplane, wherein the backplane comprises a second electrode layer, wherein the second electrode layer comprises a second electrode contact location, wherein at least part of the second electrode contact location is outside the volume defined by the vertical extension of the perimeter of the upper surface of the electrophoretic material layer, wherein the backplane has an upper surface, a lower surface, and a peripheral surface, and wherein the lower surface of the first adhesive layer is in contact with the upper surface of the backplane; (3) depositing an edge seal composition around the peripheral surface of the first light-transmissive layer, the peripheral surface of the electrophoretic medium layer, and the peripheral surface of the first adhesive layer; (4) curing the edge seal composition to form a conductive edge seal.

DETAILED DESCRIPTION

Figure 1A:
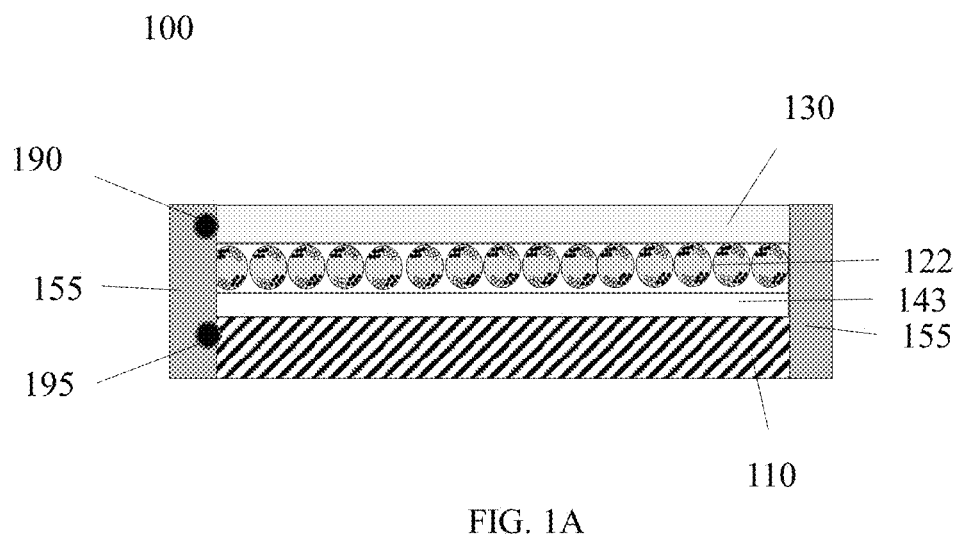
FIG. 1A is a schematic cross-section illustrating an electro-optic device of the present invention formed using a front plane laminate.

The present invention has a number of different aspects. These various aspects will primarily be described separately below, but it should be recognized that a single electro-optic device or component thereof may make use of multiple aspects of the present invention.

The electro-optic device of the present invention may be an electrophoretic display.

Before describing in detail the various aspects of the present invention it is useful to set out certain definitions.

The term "substantially the same" referring to two areas to be compared means that one of the areas is from about 97% to about 103% of the other area.

The term "light-transmissive" means that the layer thus designated transmits sufficient light to enable an observer, looking through that layer, to observe the change in display states of the electrophoretic medium, which will be normally viewed through the first electrode layer and adjacent substrate, if present.

The term "light-transmissive electrode layer" is used consistent with its conventional meaning in the art of electro-optic displays and in the aforementioned patents and published applications, to mean a rigid or flexible material that is light-transmissive. The light-transmissive electrode layer comprises most commonly a single continuous electrode (comprising an electrically conductive material) extending across the entire display viewing side. Typically, the surface of the light-transmissive electrode layer that is visible to an observer forms the viewing surface through which the observer views the display, although there may be additional layers interposed between the front substrate and the viewing surface. As with the backplane, the front substrate should provide sufficient barrier properties to prevent ingress of moisture and other contaminants through the viewing side of the display.

The term "viewing side" or "viewing surface" of an electrophoretic display is the side of the electrophoretic display on which the image is displayed and can be viewed by a viewer. A typical electro-optic device has two sides, the viewing side and a back side. However, an electro-optic device may have two viewing sides.

The term "conductive" as used herein for a material or a layer or a seal refers to "electrically conductive" material or a layer or a seal.

The electro-optic device of the present invention comprises a first light-transmissive electrode layer. The first light-transmissive electrode layer has an upper surface, a lower surface, and a peripheral surface. The upper surface and the lower surface are on opposite sides of the first light-transmissive electrode layer. The term "length and width of the first electrode layer" refers to the length and width of the upper surface of the first light-transmissive electrode layer. The first light-transmissive layer comprises a first electrode contact location.

The electrophoretic material layer of the present invention comprises an electrophoretic medium. The electrophoretic medium may be compartmentalized in microcapsules or in microcell. The electrophoretic material layers has an upper surface, a lower surface, and a peripheral surface. The upper surface and the lower surface are on opposite sides of the electrophoretic material layer. The upper surface of the electrophoretic material layer is defined by a perimeter. The perimeter has a length and a width.

The electro-optic device of the present invention may comprise a first adhesive layer and/or a second adhesive layer. The first adhesive layer has an upper surface, a lower surface, and a peripheral surface. The upper surface and the lower surface are on opposite sides of the first adhesive layer. The term "length and width of the first adhesive layer" refers to the length width dimensions of the upper surface of the first adhesive layer. The second adhesive layer has an upper surface, a lower surface, and a peripheral surface. The upper surface and the lower surface are on opposite sides of the second adhesive layer. The term "length and width of the second adhesive layer" refers to the length and width dimensions of the upper surface of the second adhesive layer.

The electro-optic device of the present invention comprises a backplane. The backplane comprises a second electrode layer. The backplane has an upper surface, a lower surface, and a peripheral surface. The upper surface and the lower surface are on opposite sides of the backplane. The term "length and width of the backplane" refers to the length and width of the upper surface of the backplane.

The term "backplane" is used herein consistent with its conventional meaning in the art of electro-optic devices and in the aforementioned patents and published applications, to mean a rigid or flexible material comprising an electrode layer having one or more electrodes. The backplane may also be provided with electronics for addressing the display, or such electronics may be provided in a unit separate from the backplane. In flexible displays, it is highly desirable that the backplane provide sufficient barrier properties to prevent ingress of moisture and other contaminants through the non-viewing side of the display (the display is of course normally viewed from the side remote from the backplane).

The term "active display area" is the area of the viewing surface of the electrophoretic display where a variable image can be displayed. Variable image of an electrophoretic display is an image that can be created as a result of the application of electric field on an electrophoretic material layer of the electrophoretic display.

The present invention improves the performance and cost of electro-optic devices and facilitates their method of manufacturing. Examples of such devices are illustrated in FIGS. 1A, 1B, 1D, and 5.

FIG. 1A is a schematic cross-section of an example of an electro-optic device 100 according to the present invention that may be constructed starting from a front plane laminate. The electro-optic device 100 comprises a first light-transmissive electrode layer 130, an electrophoretic material layer 122, comprising encapsulated electrophoretic medium, a first adhesive layer 143, a backplane 110 comprising a second electrode layer, and a conductive edge seal 155. The first light-transmissive electrode layer comprises a first electrode contact location 190. The electrophoretic material layer 122 comprises an electrophoretic medium compartmentalized in microcapsules. Alternatively, the electrophoretic medium may be compartmentalized in microcells. The electrophoretic medium may comprise electrophoretic particles in a non-polar liquid. The backplane 110 comprises a second electrode layer (not shown in FIG. 1A); the second electrode layer comprises a second electrode contact location 195. The electrophoretic material layer 122 has an upper surface, a lower surface, and a peripheral surface. The upper surface of the electrophoretic material layer is defined by a perimeter, which has a length and a width. Each of the other layers of the electro-optic device, that is, the first light-transmissive electrode layer 130, the first adhesive layer 143, and the backplane 110, has an upper surface, a lower surface, and a peripheral surface. The upper surface of the electrophoretic material layer 122 is in contact with the lower surface of the first light-transmissive electrode layer 130. The lower surface of the electrophoretic material layer 122 is in contact with the upper surface of the first adhesive layer 143. The lower surface of the first adhesive layer 143 is in contact with the upper surface of the backplane 110. The conductive edge seal 155 is disposed on the peripheral surfaces of the first light-transmissive electrode layer 130, the electrophoretic material layer 122, and the first adhesive layer 143. The conductive edge seal 155 may also be disposed on the peripheral surfaces of the backplane 110 or part of the peripheral surface of the backplane 110.

In typical electro-optic devices, the edge seal is used to prevent the ingress of moisture into the electrophoretic material. In the device 100 of FIG. 1A, the conductive edge seal 155 is also used to electrically connect the first light-transmissive electrode layer 130 and the second electrode layer of the backplane 110 at the first electrode contact location 190 and at the second electrode contact location 195 respectively. At least part of the first electrode contact location 190 and at least part of the second electrode contact location 195 are outside the volume defined by the vertical extension of the perimeter of the upper surface of the electrophoretic material layer 122.

The electro-optic device 100 of FIG. 1A is a three-layer electro-optic display. Its manufacturing process may involve at least one lamination operation. For example, in several of the aforementioned E Ink patents and applications a process for manufacturing of an encapsulated electrophoretic display is described, wherein an encapsulated electrophoretic medium comprising microcapsules in a binder is coated onto a flexible substrate comprising indium-in-oxide (ITO) or similar conductive coating. This conductive coating is the first light-transmissive electrode layer 130. Drying or curing the microcapsules/binder coating forms the electro-optic material layer 122, which is firmly adhered to the first light-transmissive layer 130. Separately, a backplane 110 is prepared, comprising a second electrode layer having an array of pixel electrodes and an appropriate arrangement of semiconductors to connect the pixel electrodes to drive circuitry. The substrate having the electrophoretic material layer 122 is laminated onto the backplane 110 using a lamination adhesive of the first adhesive layer 143. A very similar process can be used to prepare an electrophoretic display useable with a stylus or similar movable electrode by replacing the backplane with a simple protective layer, such as a plastic film, over which the stylus or other movable electrode can slide. In one form of such a process, the backplane is itself flexible and is prepared by printing the pixel electrodes and conductors on a plastic film or other flexible substrate. A lamination technique for mass production of displays by this process is roll lamination using a lamination adhesive. Similar manufacturing techniques can be used with other types of electro-optic devices. For example, a microcell electrophoretic medium or a rotating bichromal member medium may be laminated to a backplane in substantially the same manner as an encapsulated electrophoretic medium.

The electro-optic device 100 of FIG. 1A may be manufactured using a front plane laminate, which comprises, in order, a light-transmissive electrically-conductive layer, an electrophoretic material layer, a first adhesive layer, and a release sheet. The light-transmissive layer may be carried on a light-transmissive substrate, which is preferably flexible, in the sense that the substrate can be manually wrapped around a drum, say, 25 mm in diameter without permanent deformation. The substrate will be typically a polymeric film, and will normally have a thickness in the range of about 1 to about 25 mil (25 to 634 µm), preferably about 2 to about 10 mil (51 to 254 µm). The light-transmissive, electrically conductive layer is conveniently a thin metal layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E. I. du Pont de Nemours & Company, Wilmington Del., and such commercial materials may be used with good results in the front plane laminate.

Assembly of an electro-optic device using such a front plane laminate may be effected by removing the release sheet from the front plane laminate and contacting the first adhesive layer with the backplane under conditions effective to cause the first adhesive layer to adhere to the backplane, thereby securing the first adhesive layer, electrophoretic medium and electrically-conductive layer to the backplane. This process is well-adapted to mass production since the front plane laminate may be mass produced, typically using roll-to-roll coating techniques, and then cut into pieces of any size needed for use with specific backplanes. Then, an edge seal compositions is dispensed around the piece to create the conductive edge seal after drying or curing of the edge seal composition. The device is typically exposed to a moisture conditioning step at certain temperature and relative humidity before edge sealing.

Figure 1B:
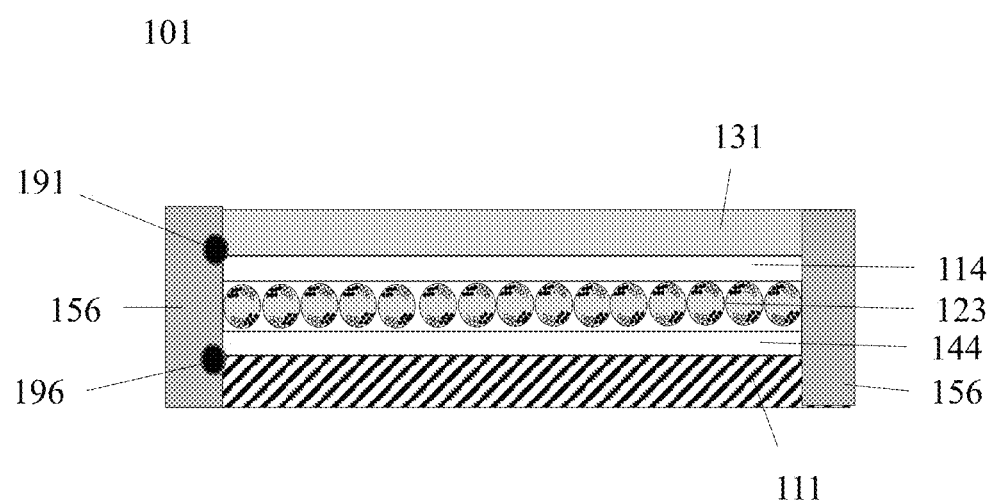
FIG. 1B is a schematic cross-section illustrating an electro-optic device of the present invention formed using a double release film.

FIG. 1B is a schematic cross-section of another example of an electro-optic device according to the present invention. The electro-optic device 101 comprises a first light-transmissive electrode layer 131, a second adhesive layer 114, an electrophoretic material layer 123, a first adhesive layer 144, a backplane 111, and a conductive edge seal 156.

The first light-transmissive electrode layer 131 comprises a first electrode contact location 191. The electrophoretic material layer 123 comprises an electrophoretic medium compartmentalized in microcapsules. The electrophoretic medium may comprise electrophoretic particles in a non-polar liquid. The backplane 111 comprises a second electrode layer; the second electrode layer comprises a second electrode contact location 196. The electrophoretic material layer 123 has an upper surface, a lower surface, and a peripheral surface. The upper surface of the electrophoretic material layer is defined by a perimeter, which has a length and a width. Each of the other layers of the electro-optic device, that is, the first light-transmissive electrode layer 131, the second adhesive layer 114, the first adhesive layer 144, and the backplane 111, has an upper surface, a lower surface, and a peripheral surface.

The lower surface of the first light-transmissive electrode layer 131 is in contact with the upper surface of the second adhesive layer 114, the lower surface of the second adhesive layer 114 is in contact with the upper surface of the electrophoretic material layer 123. The lower surface of the electrophoretic material layer 123 is in contact with the upper surface of the first adhesive layer 144. The lower surface of the first adhesive layer 144 is in contact with the upper surface of the backplane 111.

The conductive edge seal 156 is disposed on the peripheral surfaces of the first light-transmissive electrode layer 131, the second adhesive layer 114, the electrophoretic material layer 123, and the first adhesive layer 144. The conductive edge seal 156 may also be disposed on the peripheral surfaces of the backplane 111 or part of the peripheral surface of the backplane 111.

In typical electro-optic devices, the edge seal is used to prevent the ingress of moisture into the electrophoretic material. In the device 101 of FIG. 1B, the conductive edge seal 156 is also used to electrically connect the first light-transmissive electrode layer 131 and the second electrode layer of the backplane 111 at the first electrode contact location 191 and at the second electrode contact location 196 respectively. At least part of the first electrode contact location 191 and at least part of the second electrode contact location 196 are outside the volume defined by the vertical extension of the perimeter of the upper surface of the electrophoretic material layer 123.

The electro-optic device 101 of FIG. 1B is a four-layer electrophoretic display. Its manufacturing process may involve at least two lamination operations starting from a structure that comprises, in order, an electrophoretic material layer sandwiched between two adhesive layers, one or both of the adhesive layers being covered by a release sheet (double release sheet). In a first lamination the double release sheet is laminated to a first light-transmissive electrode layer, and then in a second lamination the other side of the electrophoretic material layer is laminated onto a backplane to form the electrophoretic display. The order of these two laminations could be reversed, if desired. The electro-optic device of FIG. 1B may also be constructed starting from a structure, which comprises, in order, a light-transmissive protective layer, a light-transmissive electrode layer, a second adhesive layer, an electrophoretic material, a first adhesive layer and a release sheet. Removal of the release sheet and attachment of a backplane onto the structure followed by the dispensing of a conductive edge seal composition around the electrophoretic material layer and the adhesive layers and drying or curing of the dispensed composition to create the conductive edge seal forms the electro-optic device. The device is typically exposed to a moisture conditioning step at certain temperature and relative humidity before edge sealing. Electro-optic devices of the type illustrated in FIG. 1B can combine good resolution with good low temperature performance.

Figure 1C:
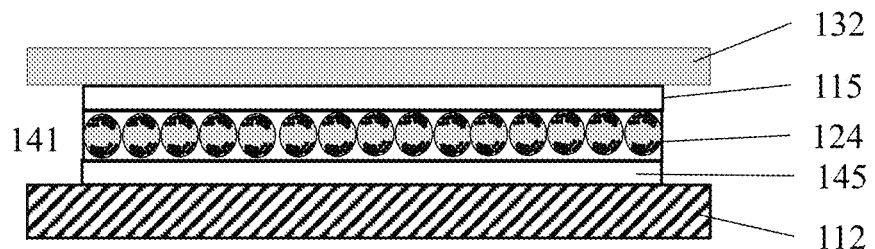
FIGS. 1C and 1D are schematic cross-sections illustrating an electro-optic device of the present invention comprising a groove.
Figure 1D:
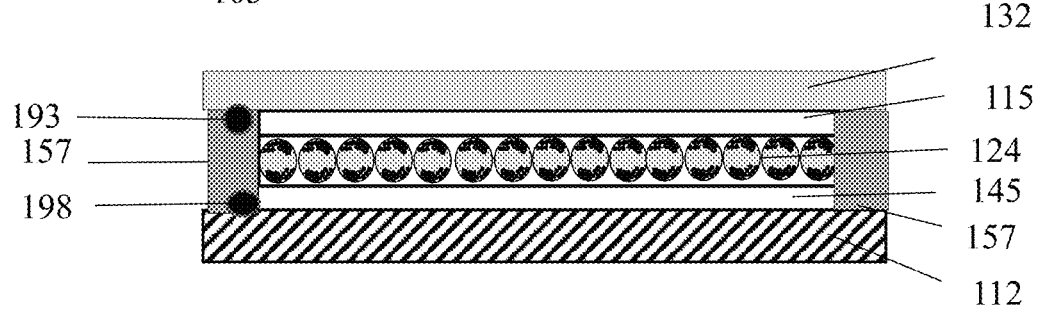

A schematic cross-section of another example of an electro-optic device according to the present invention is provided in FIG. 1D. The electro-optic device 103 comprises a first light-transmissive electrode layer 132, a second adhesive layer 115, an electrophoretic material layer 124, comprising encapsulated electrophoretic medium, a first adhesive layer 145, a backplane 112 comprising a second electrode layer, and a conductive edge seal 157. The conductive edge seal 157 is disposed on the peripheral surfaces of the second adhesive layer 115, the electrophoretic material layer 124, and the first adhesive layer 145. The electro-optic device 103 of FIG. 1D resembles the electro-optic device 101 of FIG. 1B. In contrast to the electro-optic device 101 of FIG. 1B, where the length and width of the upper surfaces of a layer is similar to the length and width of the upper surfaces of the other layers, the length and width of the upper surface of the layers of the electro-optic device 103 of FIG. 1D are not all the same. Specifically, in device 103 the length and width of the upper surface of the first light-transmissive electrode layer 132 and the length and width of the upper surface of the backplane 112 are larger than the length and width of the perimeter of the upper surface of the electrophoretic material layer 124, the length and width of the upper surface of the first adhesive layer 145, and the length and width of the upper surface of the second adhesive layer 115.

The first light-transmissive electrode layer 132 and the backplane 112 of device 103 extend outwardly beyond the edges of the perimeter of the upper surface of the electrophoretic material layer and the edges of the first and the second adhesive layers. Thus, a groove is formed, which is defined by the outwardly extended first light-transmissive electrode layer 132, the peripheral surface of the second adhesive layer 115, the peripheral surface of the electrophoretic material layer 124, the peripheral surface of the first adhesive layer 145, and the outwardly extended backplane 112. The formed groove is filled with the conductive edge seal 157. As in device 101, the conductive edge seal 157 in device 103 is used not only to prevent the ingress of moisture into the electrophoretic material, but also to electrically connect the first light-transmissive electrode layer 132 and the second electrode layer of the backplane 112 at the first electrode contact location 193 and at the second electrode contact location 198 respectively. At least part of the first electrode contact location 193 and at least part of the second electrode contact location 198 are outside the volume defined by the vertical extension of the perimeter of the upper surface of the electrophoretic material layer 124. The electro-optic device of FIG. 1D is a four-layer electrophoretic display. The precursor of the device of FIG. 1D is structure 102 shown in FIG. 1C, wherein the upper surfaces of the first light-transmissive electrode layer 132 and the backplane 112 have length and width that are larger than the length and width of the perimeter of the upper surfaces of the electrophoretic material 124, and the length and width of the upper surfaces of the adhesive layers 115 and 145. The first light-transmissive electrode layer 132 and the backplane 112 extend outwardly beyond the edges of the perimeter of the upper surface of the electrophoretic material layer 124 and the edges of the first and the second adhesive layers 115 and 124. Thus, a groove 141 is formed which is defined by the outwardly extended first light-transmissive electrode layer 132, the peripheral surface of the second adhesive layer 115, the peripheral surface of the electrophoretic material layer 124, the peripheral surface of the first adhesive layer 145, and the outwardly extended backplane 112. The electro-optic device 103 is completed by dispensing an edge sealing composition into groove 141 and drying or curing the edge sealing composition to form conductive edge seal 157. The groove may height of from about 20 µm to about 150 µm and width of from about 0.3 mm to about 5 mm.

Figure 1E:
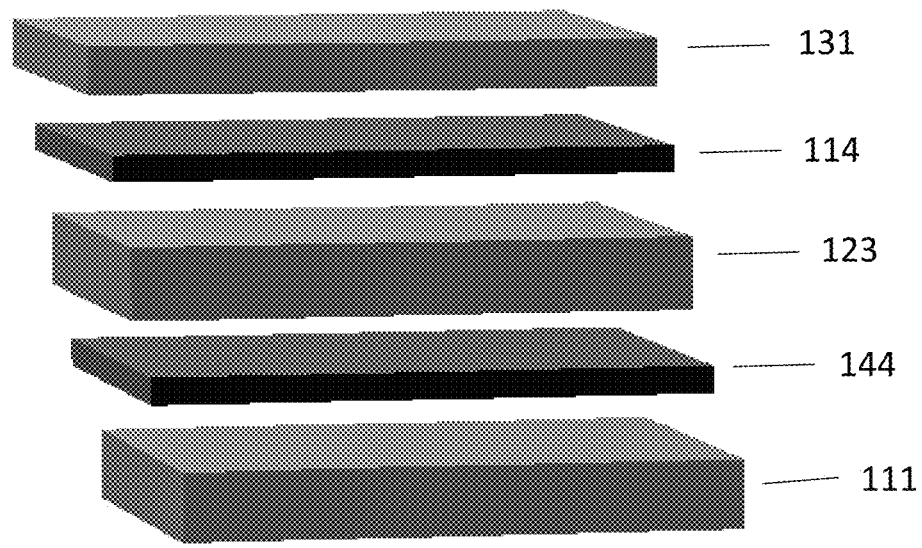
FIGS. 1E to 1H are three-dimensional schematics illustrating electro-optic devices of the present invention.
Figure 1F:
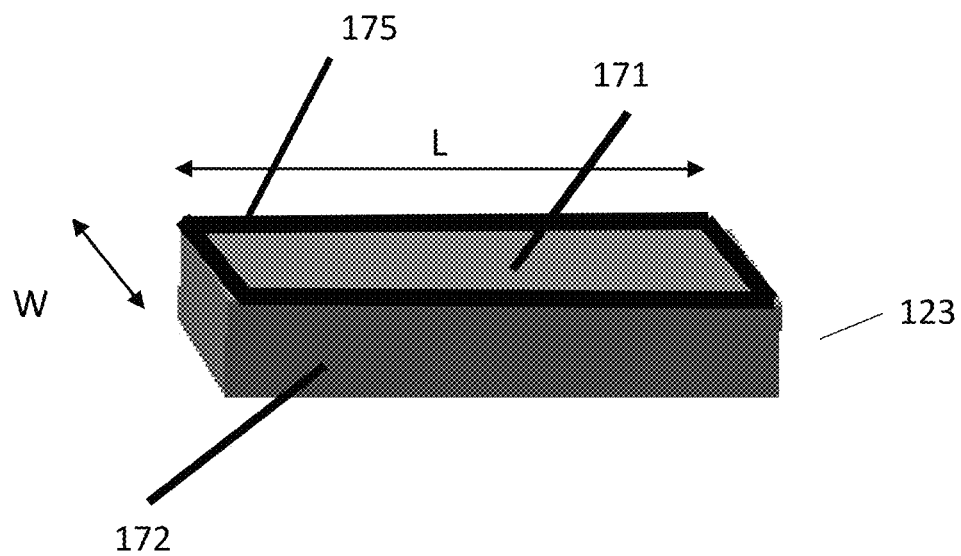

FIG. 1E shows a perspective view of the electro-optic device 101 illustrated in FIG. 1B, but it does not show the conductive edge seal. The neighboring layers appear unconnected from each other in FIG. 1E just to facilitate three-dimensional perspective of the layers. The device comprises, in order, a first light-transmissive electrode layer 131, a second adhesive layer 114, an electrophoretic material layer 123, a first adhesive layer 144, and a backplane 111. FIG. 1F is a perspective view of the electrophoretic material layer 123 only. FIG. 1F shows the upper surface 171 of the electrophoretic material layer 123 and the peripheral surface 172 of the electrophoretic material layer 123. It also shows the perimeter 175 of the upper surface 171 of the electrophoretic material layer 123. The upper surface of the electrophoretic material layer 171 is defined by the perimeter 175. The perimeter 175 of the upper surface 171 of the electrophoretic material layer 123 a length L and width W, as shown in FIG. 1F.

FIG. 1F shows the upper surface 171 of the electrophoretic material layer 123 and the peripheral surface 172 of the electrophoretic material layer 123. It also shows the perimeter 175 of the upper surface 171 of the electrophoretic material layer 123. The upper surface of the electrophoretic material layer 171 is defined by the perimeter 175. The perimeter 175 of the upper surface 171 of the electrophoretic material layer 123 a length L and width W, as shown in FIG. 1F.

Figure 1G:
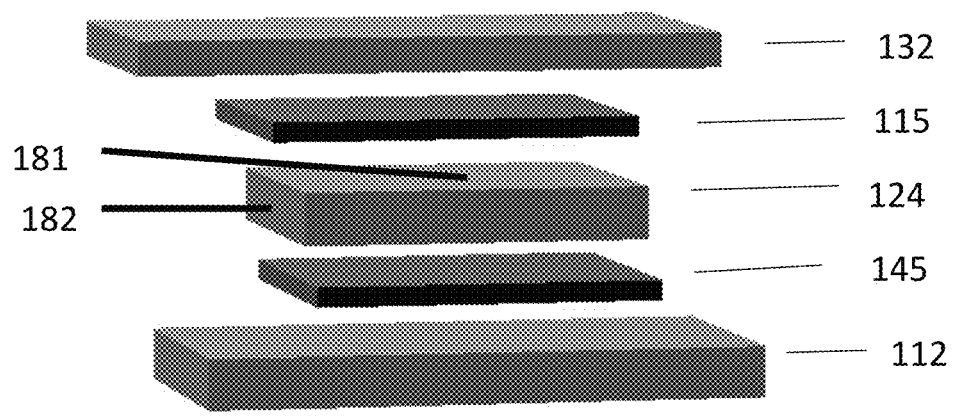
Figure 1H:
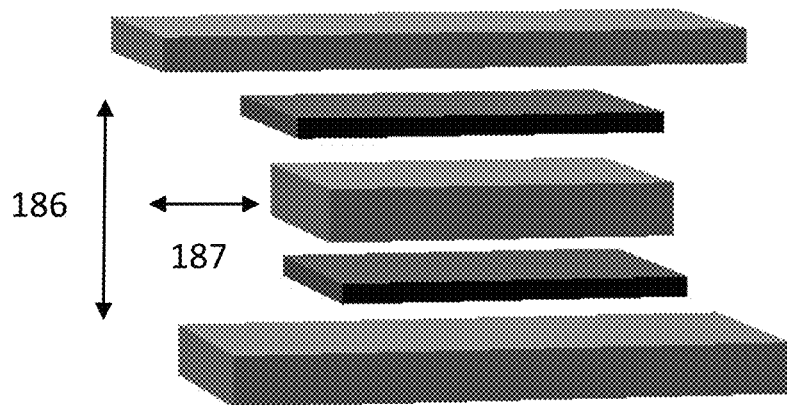

FIGS. 1G and 1H show a perspective view of the precursor 102 of an electro-optic device (also illustrated in FIG. 1C). The neighboring layers in 102 appear unconnected from each other in FIG. 1G just to facilitate three-dimensional perspective of the layers. The device comprises, in order, a first light-transmissive electrode layer 132, a second adhesive layer 115, an electrophoretic material layer 124, a first adhesive layer 145, and a backplane 112.

The upper surfaces of the first light-transmissive electrode layer 132 and the backplane 112 have length and width that are larger than the length and width of the perimeter of the upper surfaces of the electrophoretic material 124, and the length and width of the upper surfaces of the adhesive layers 115 and 145. The first light-transmissive electrode layer 132 and the backplane 112 extend outwardly beyond the edges of the perimeter of the upper surface of the electrophoretic material layer 124 and the edges of the first and the second adhesive layers 115 and 124. Thus, a groove is formed which is defined by the outwardly extended first light-transmissive electrode layer 132, the peripheral surface of the second adhesive layer 115, the peripheral surface of the electrophoretic material layer 124, the peripheral surface of the first adhesive layer 145, and the outwardly extended backplane 112. The groove, into which a conductive edge seal composition may be disposed, has height 186 and width 187, as shown in FIG. 1H.

Figure 2A:
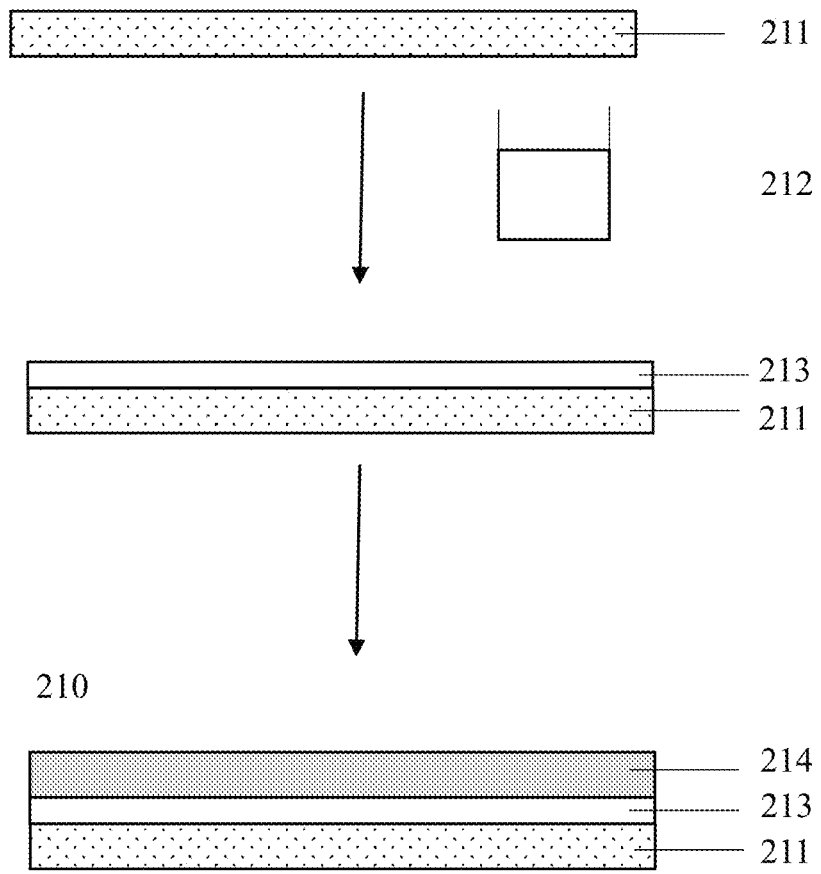
FIGS. 2A to 2C and 3A to 3C are schematic cross-sections illustrating various stages of a process of producing an electro-optic device according to the present invention.
Figure 2B:
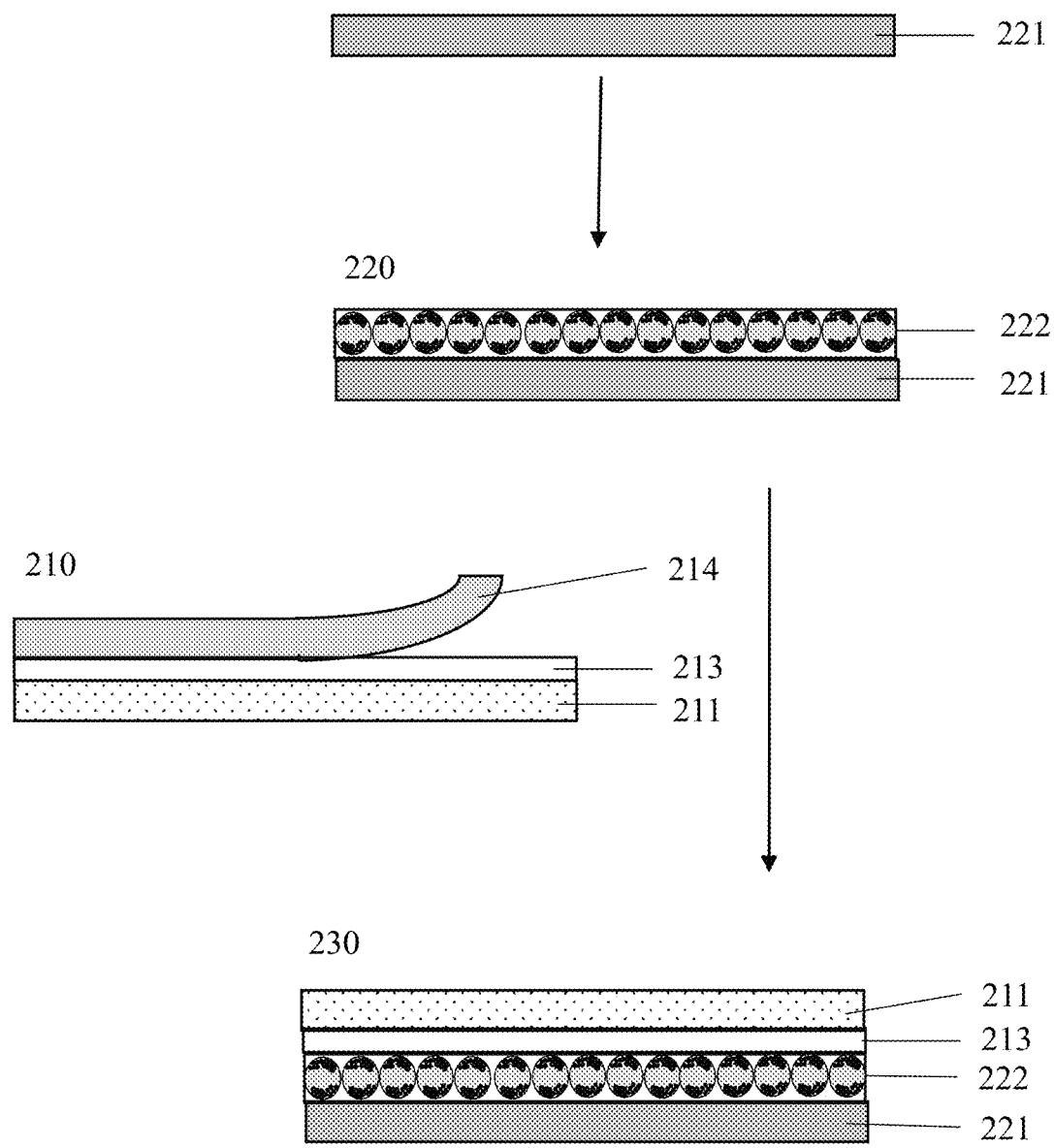
Figure 2C:
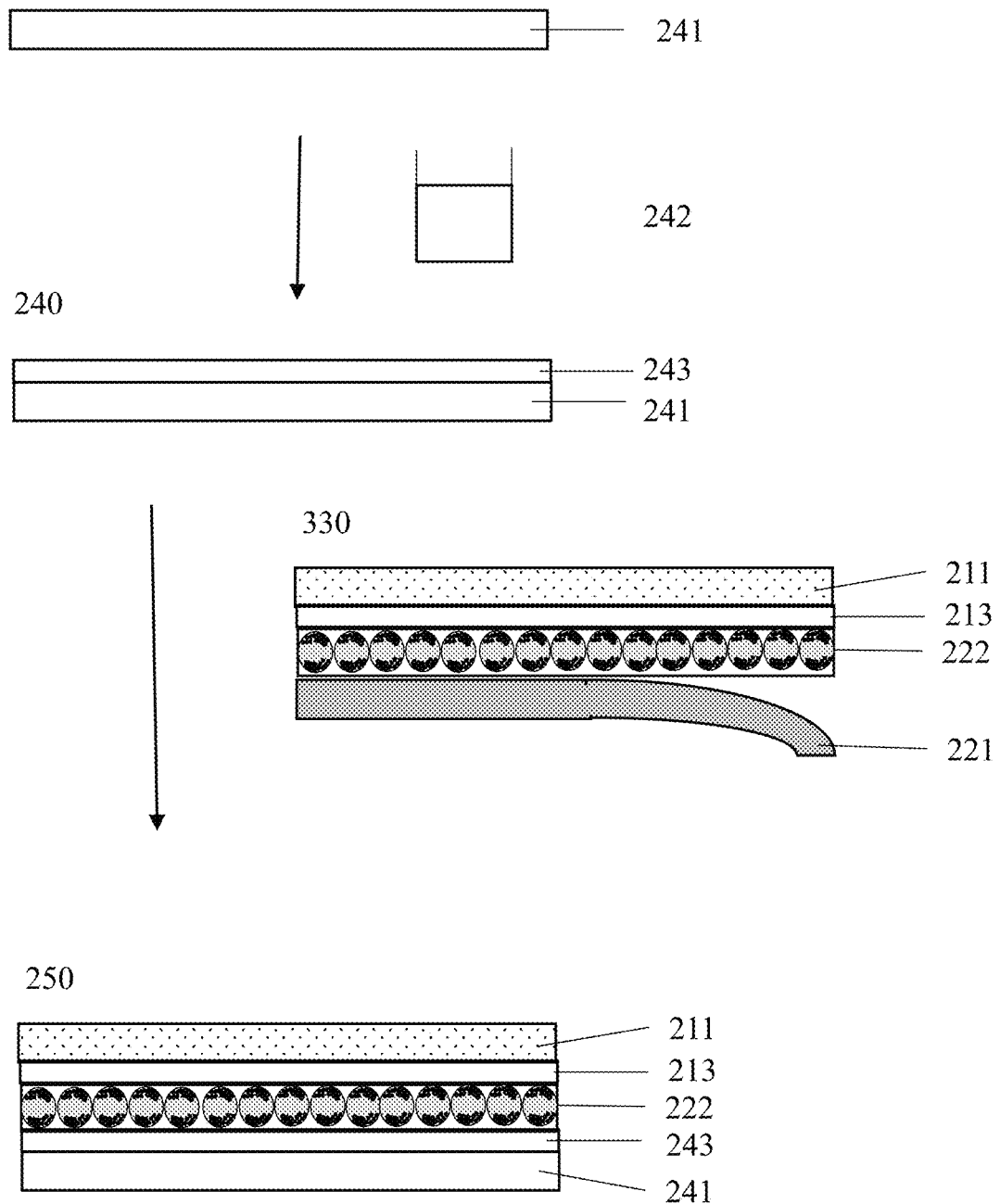
Figure 3A:
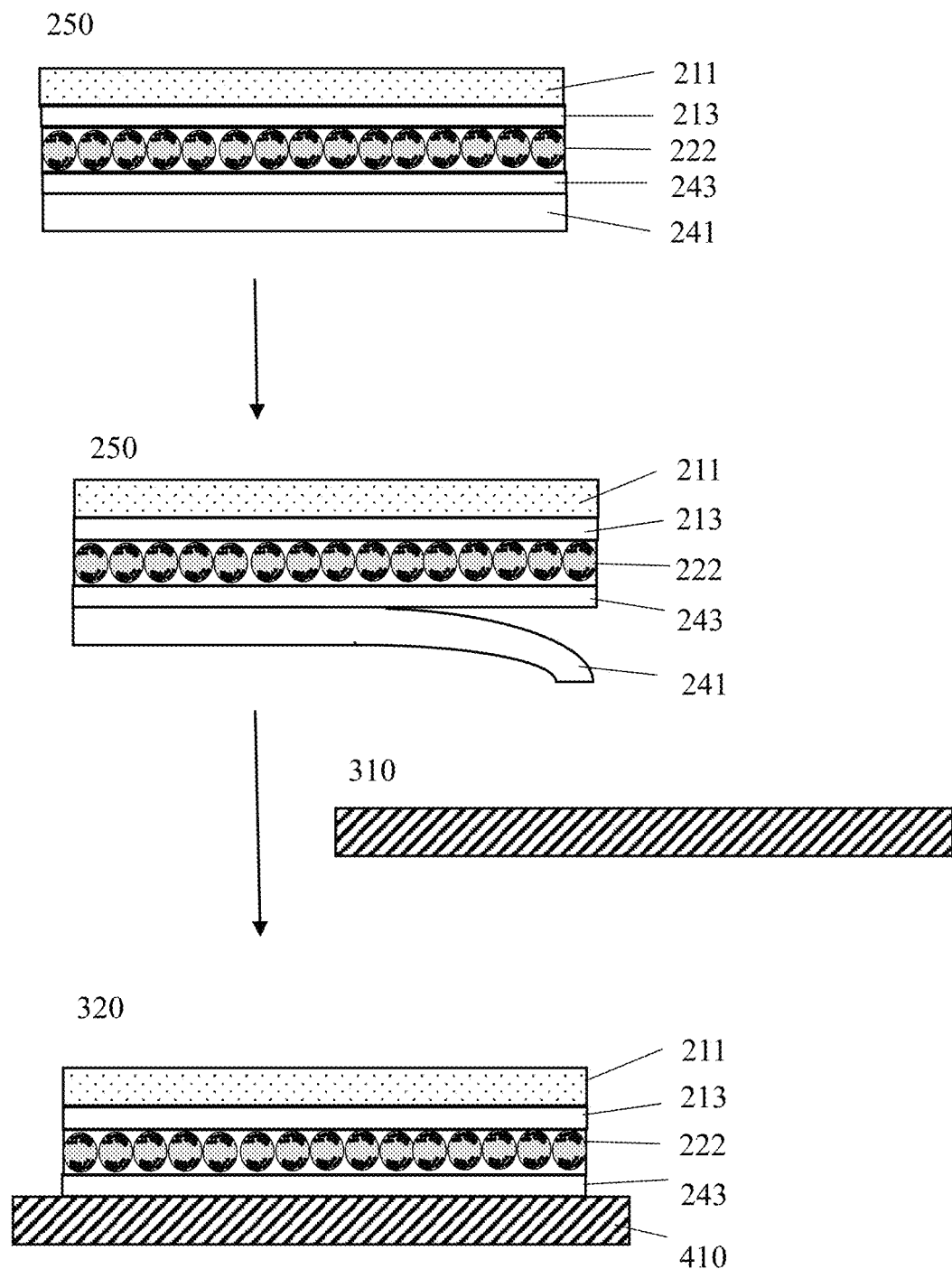
Figure 3B:
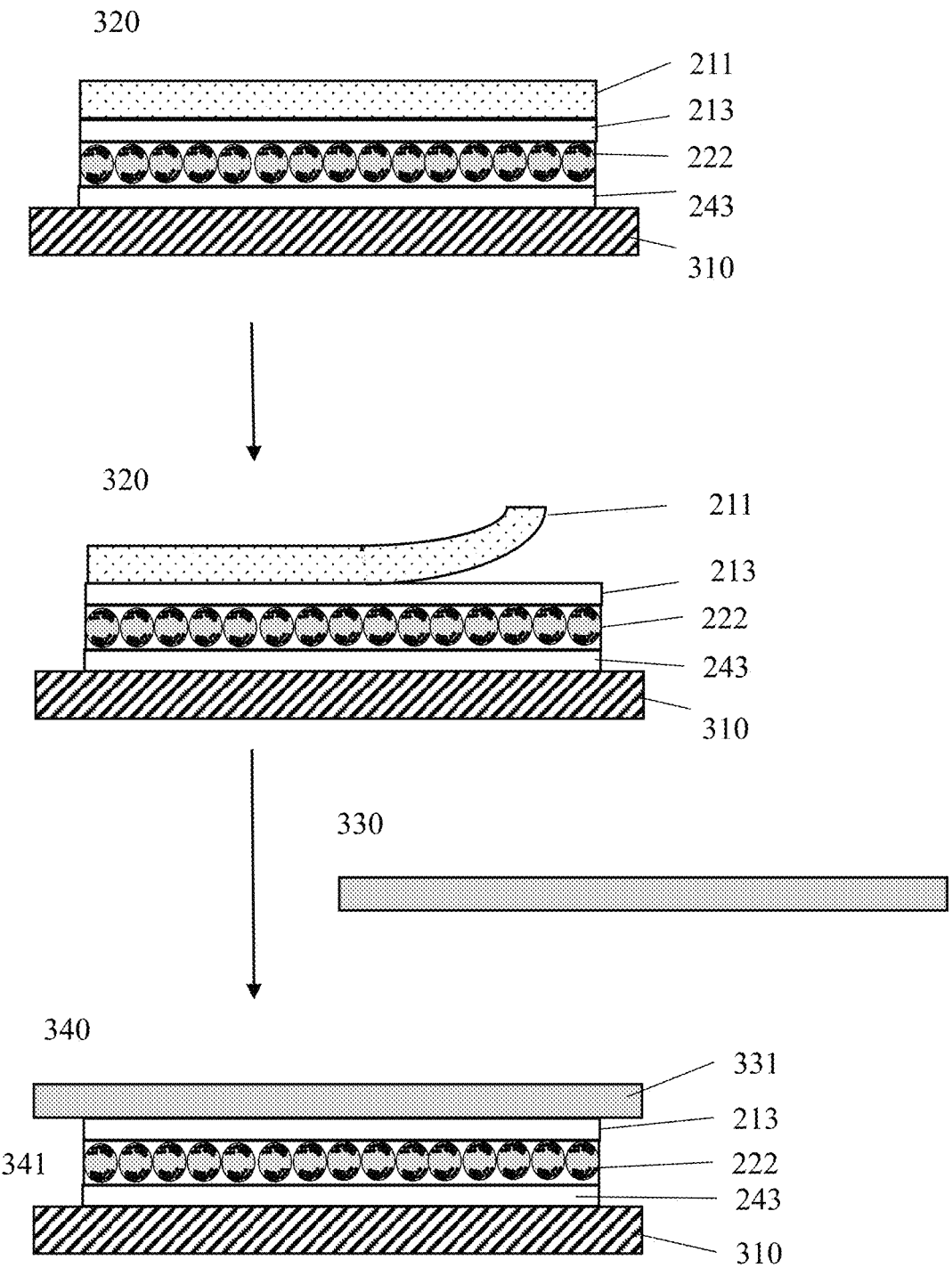
Figure 3C:
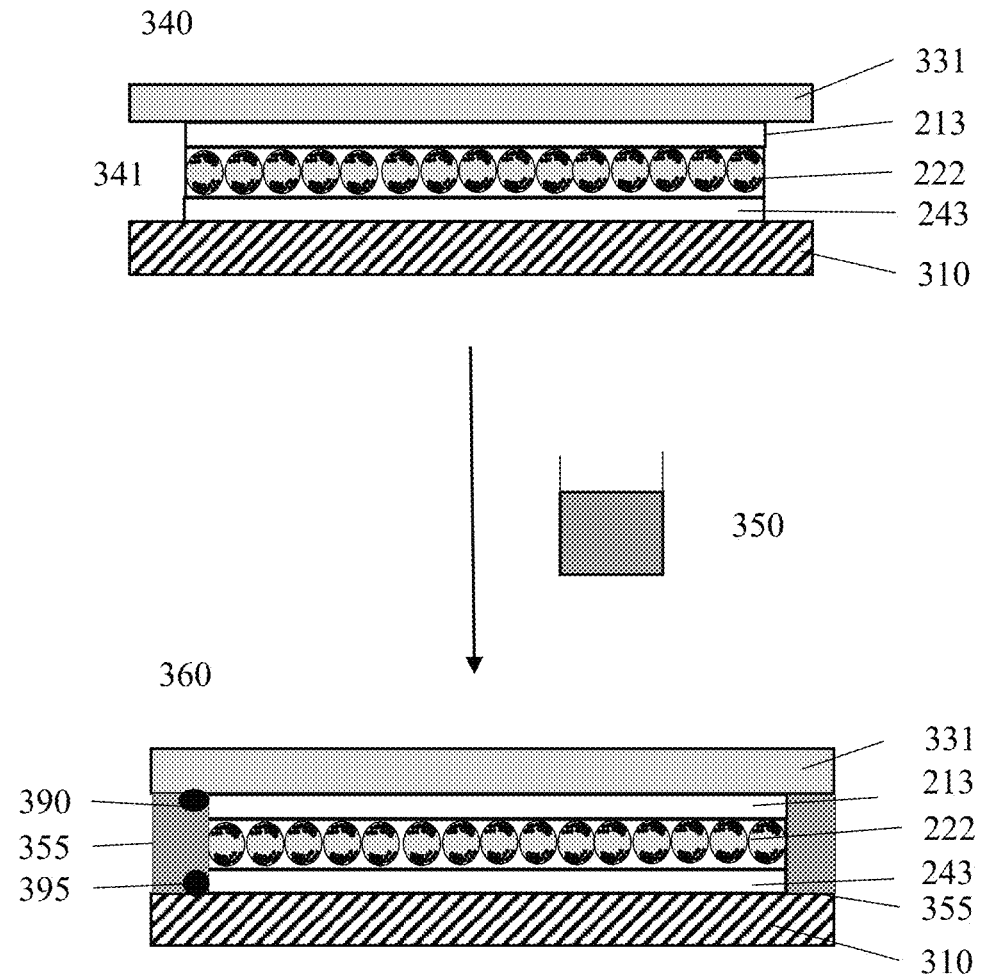

FIGS. 2A to 2C and 3A to 3C illustrate an example of the process of manufacturing of an example of inventive electrophoretic display using a double release film. As illustrated in FIG. 2A, the first step involves coating of a second adhesive composition 212 onto a second release sheet 211 to form the second adhesive layer 213 on the second release sheet 211. Subsequently, a third release sheet 214 is placed on the second adhesive layer 213 to form a first release roll 210. In a separate sub-process illustrated in FIG. 2B, an electrophoretic material composition is coated onto a fourth release sheet 221 to form structure 220, which is an electrophoretic material layer 222 on the fourth release sheet 221. After releasing the third release sheet 214 from the first release roll 210 and contacting the exposed second adhesive layer 213 with the electrophoretic material layer 222 of structure 220, an intermediate electro-optic web 230 is formed. The intermediate electro-optic web 230 can be used to form a double release film 250, as illustrated in FIG. 2C. More specifically, a first adhesive composition 242 is coated onto a first release sheet 241 to form a second release roll 240. After releasing the fourth release sheet 221 from the intermediate electro-optic web 230 and contacting the exposed surface of the electrophoretic material layer 222 with the first adhesive layer 243 of the second release roll 240, the double release film 250 is formed. The double release film 250 can be used to form an electro-optic device. The double release sheet may be stored and used for the production of the electro-optic device at a later time. An example of the process is illustrated in FIG. 3A to 3C. The first release sheet 241 of the double release film 250 is removed and a backplane 310 is connected to the exposed surface of the first adhesive layer 243 to form structure 320, as shown in FIG. 3A. The second release sheet 211 from structure 320 is removed and the exposed second adhesive layer 213 is connected to a first light-transmissive electrode layer 330 to form structure 340 having a first light-transmissive electrode layer 331. As shown in FIG. 3B, the backplane 310 may have a length and width that are larger than the corresponding length and width of the electrophoretic material layer 222 and the first and second adhesive layers 243 and 213. Thus, the backplane 310 may extend outwardly beyond the edges of the perimeter of the upper surface of the electrophoretic material layer 222 and the first and second adhesive layers 243 an 213. Analogously, the first light-transmissive electrode layer 331 may have length and width that are larger than the corresponding length and width of the perimeter of the upper surface of the electrophoretic material layer 222 and the first and second adhesive layers 243 and 213. Thus, the first light-transmissive electrode layer 331 may extend outwardly beyond the edges of the perimeter of the upper surface of the electrophoretic material layer 222 and the first and second adhesive layers 243 and 213. If these conditions are met, a groove 341 is formed in structure 340, which is defined by the outwardly extended first light-transmissive electrode layer 331, the peripheral surface of the second adhesive layer 213, the peripheral surface of the electrophoretic layer 222, the peripheral surface of the first adhesive layer 243 and the outwardly extended backplane 310. A conductive edge seal composition 350 is disposed into the groove 341 and cured to an edge seal 355 to form electro-optic device 360, as illustrated in FIG. 3C.

Figure 5:
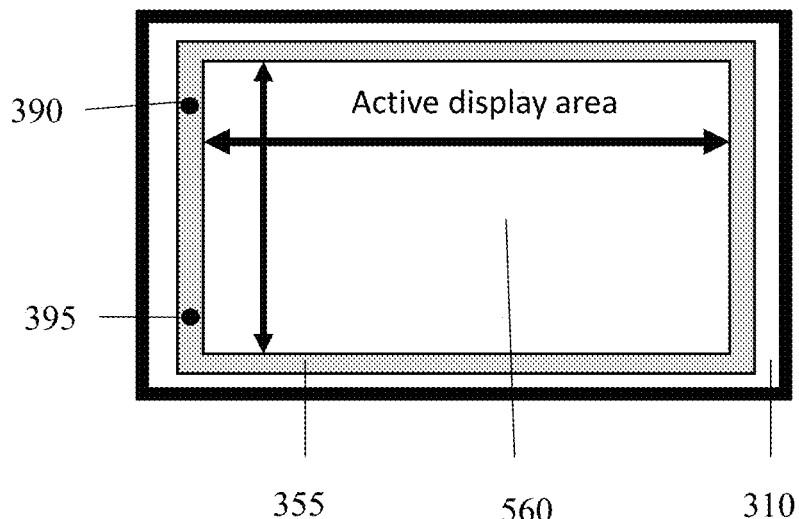
FIG. 5 is a top view of an electro-optic device of the present invention illustrating the active display area of the device.

The electro-optic device of the present invention comprises a conductive edge seal that contacts the first light-transmissive electrode layer at a first electrode contact location and the second electrode layer at a second electrode contact location. At least part of the first electrode contact location and the second electrode contact location are outside the volume defined by the vertical extension of the perimeter of the upper surface of the electrophoretic material layer. The conductive edge seal, which electrically connects the first and the second electrode layers at the first electrode contact location and at the second electrode contact location enable that the active display area of the device is optimized and being substantially the same as the area of the electrophoretic material layer. This is shown in FIG. 5, which illustrates a top view of an electro-optic device according to the present invention. The electro-optic device 360 in FIG. 5 corresponds to the electro-optic device, the cross-section of which is provided in FIG. 3C, wherein both the first light-transmissive electrode layer and the backplane 310 extend outwardly beyond the edges of the electrophoretic material layer. The conductive edge seal 355, which is disposed into the groove, which is created by the extensions of the first light-transmissive electrode layer and the second electrode layer, electrically connects the first light-transmissive layer and the second electrode layer at a first electrode contact location (390) and at a second electrode contact location (395), respectively. The active display area 560 is substantially the same as the area of the upper surface of the electrophoretic material layer, as opposed to an active display area that has different structure of the electro-optic device of the present invention, shown in FIGS. 5 and 6.

Figure 4:
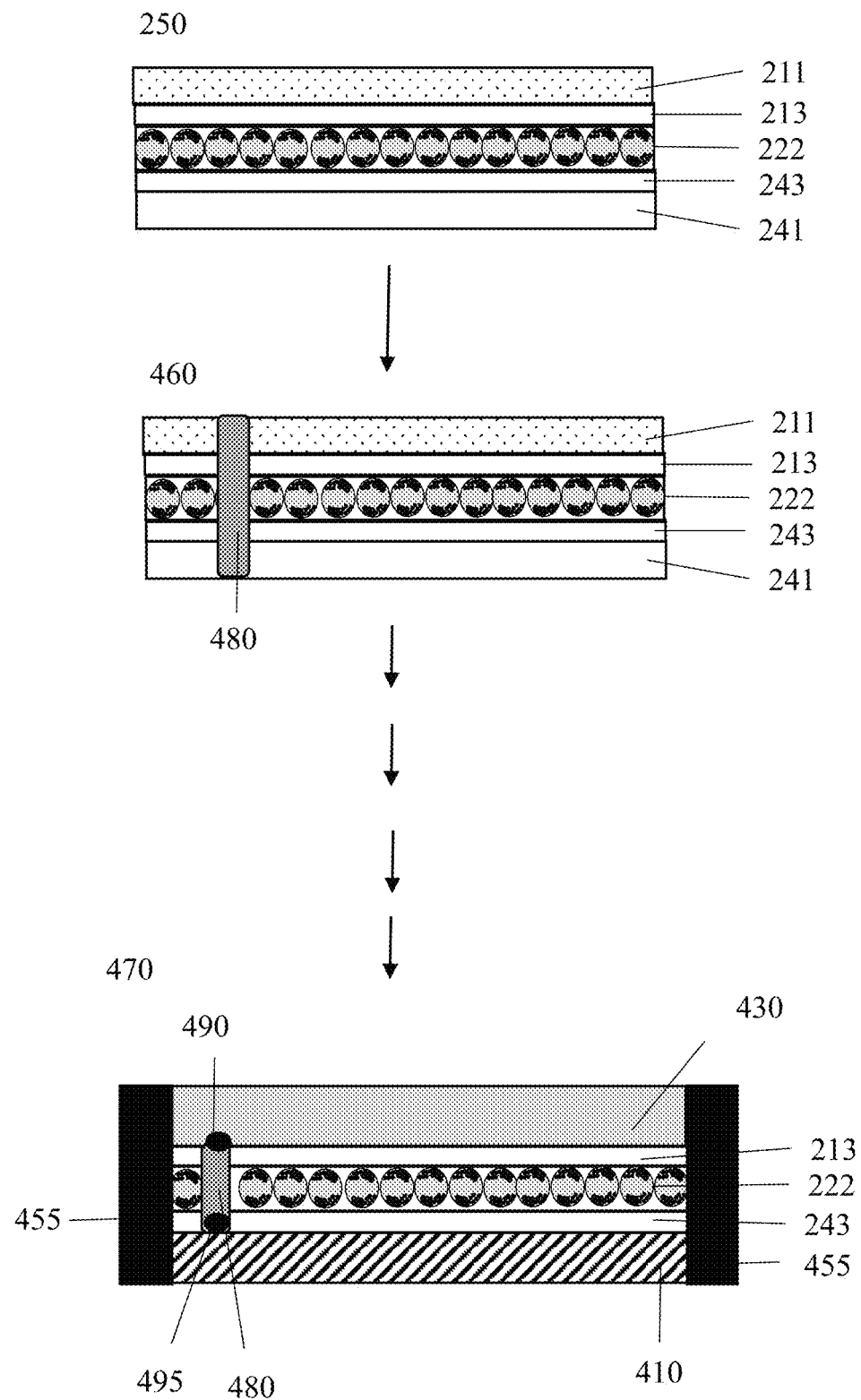
FIG. 4 is a schematic cross-section illustrating an electro-optic device disclosed in the art, and the corresponding structure of electro-optic device having an aperture comprising a conductive material.

FIG. 4 is a schematic cross-section of an electro-optic device according to the prior art. The electro-optic device 470 comprises a first light-transmissive electrode layer 430, a second adhesive layer 213, an electrophoretic material layer 222, comprising encapsulated electrophoretic medium, a first adhesive layer 243, a backplane 410 (which comprises a second electrode layer), a non-conductive edge seal 455 and an aperture 480. The aperture 480 cuts through the electrophoretic material layer and the first and second adhesive layers. The aperture is filled with a conductive material, such as metal, to electrically connect the first light-transmissive electrode layer 430 and the second electrode layer of the backplane 410. The conductive material is connected to the first light-transmissive electrode layer 430 at a location 490 and to the second electrode layer of the backplane 410 at a location 495. FIG. 4 also describes intermediate structures that take part in an example of a process of production of the electro-optic device 470. The electro-optic device 470 may be prepared from a double release film 250 that comprises a first release sheet 211, a second adhesive layer 213, an electrophoretic material layer 222, a first adhesive layer 243, and a second release sheet 241. An aperture 480 is cut through the double release film and filled with a conductive material. Sequential removal of the release sheets 211 and 241 and attachment of the first light-transmissive electrode layer 430 and a backplane 410, and formation of the non-conductive edge seal 455 forms electro-optic device 470. The conductive material in aperture 480 electrically connects the first light-transmissive electrode layer at location 490 and the second electrode layer in the backplane 410 at location 495.

Figure 6:
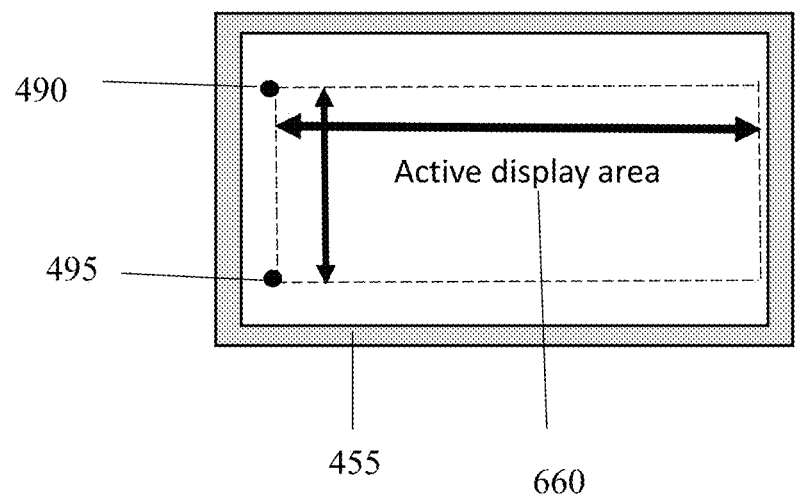
FIG. 6 is a top view of an electro-optic device having an aperture comprising a conductive material illustrating the display area of the device.

FIG. 6 illustrates a top view of an electro-optic device 470 according to the prior art present invention and it corresponds to the electro-optic device, the cross-section of which is provided in FIG. 4. In contrast to the inventive electro-optic device 360, illustrated in FIGS. 3C and 5, the edge seal of electro-optic device 470 is not conductive and does not participate in the electrical connection between the first light-transmissive electrode layer and the second electrode layer. This electrical connection in electro-optic device 470 is achieved by creating aperture 480 containing a conductive material, which connects to the first light-transmissive electrode layer at location 490 and to the first electrode layer at location 495. This electrical connections using the aperture 480, results in the active display area 660 of electro-optic device being less than the area of the electrophoretic material layer, as it is shown in FIG. 6 (inside the dashed line), as opposed to the active display area of the inventive electro-optic device 360 of FIGS. 3C and 5, wherein the active display area 560 is substantially the same as the area of the electrophoretic material layer 222.

In addition to maximizing the active display area, as shown above, there are other benefits achieved by the structure and method of manufacturing of the electro-optic device according to the present invention. Firstly, the device of the present invention can be manufactured using less steps, because there is no need to create an aperture through the electrophoretic material layer and fill it with a conductive material (conductive via). Also, there is no need to include a cleaning step of a portion of the light-transmissive electrode layer during the manufacturing of the display according to the process of the present invention. Such a step is typically included in the method of making electro-optic devices using a front plane laminate. A front plane laminate comprises an electrophoretic material coated on the light-transmissive electrode layer. A portion of the light-transmissive electrode layer is usually cleaned from the coated electrophoretic medium in order to create a clean surface for the electrical connection within the electro-optic device. Secondly, the present invention minimizes resistive voltage drop across the device, enables the use of smaller and less expensive thin-film-transistors in the backplane, and enables a simple evaluation of the quality of the corresponding devices and precursor structures.

The electro-optic device of the present invention may comprise more than one first contact locations between the first light-transmissive electrode layer and the conductive edge seal to reduce the voltage drop across the device. The electro-optic device may comprise two or more, three or more, or five or more first contact locations. Analogously, the electro-optic device of the present invention may comprise more than one second contact locations between the second electrode layer and the conductive edge seal. The electro-optic device may comprise two or more, three or more, or five or more second contact locations.

The conductive edge seal of the electro-optic device of the present invention must have sufficient barrier properties and electrical conductivity properties to prevent the ingress of moisture into the device and to be able to electrically connect the first and the second electrode layers of the device. Thus, the water vapor transmission rate of the conductive edge seal must be less than $0.1 \text{ g·m}^{-2}\text{·day}^{-1}$, or less than $0.05 \text{ g·m}^{-2}\text{·day}^{-1}$, or less than $\text{g·m}^{-2}\text{·day}^{-1}$, measured at 60° C. and 100% relative humidity (RH), measured gravimetrically (ASTM E96). The resistivity of the edge seal must be less than 50 kOhm·cm for film thickness of 2 mils, or less than 10 kOhm·cm, measure using ASTM D257.

The edge seal composition may comprise a polymer or combination of polymers. Drying or curing of the edge seal composition forms the edge seal of the device. Non-limiting examples of polymers are polyurethane, epoxy, polydimethylsiloxane, polyacrylate, polymethacrylate, polycarbonate, polyvinyl chloride, polystyrene-alkylene copolymer, polyamide, polyester, polystyrene, polyethylene, polypropylene, polyisobutylene, poly(ethylene terephthalate), poly(ethylene naphthalate), ethylene-vinyl alcohol copolymer, poly(ethylene-co-norbornene), styrene-isobutylene-styrene block copolymer and mixtures thereof. The edge seal composition may comprise conductive fillers such as metal particles, metal nanoparticles, metal wires, metal nanowires, metal nanofibers, conductive carbon black particles, carbon nanotubes, graphite, and combinations thereof. The edge seal composition may also comprise conductive polymers. Non-limiting examples of conductive polymers are poly(3,4-ethylenedioxythiophene polystyrene sulfonate (PEDOT-PSS), polyacetylene, polyphenylene sulfide, polyphenylene vinylene, and combinations thereof.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

What is claimed is:

1. An electro-optic device having an active display area and comprising
   a first light-transmissive electrode layer having an upper surface, a lower surface, and a peripheral surface, and comprising a first electrode contact location, wherein the upper surface of the first light-transmissive layer has a length and a width;
   a backplane comprising a second electrode layer, wherein the second electrode layer comprises a second electrode contact location, wherein the backplane has an upper surface, a lower surface, and a peripheral surface, and wherein the upper surface of the backplane has a length and a width;
   an electrophoretic material layer comprising an electrophoretic medium and having an upper surface, a lower surface, and a peripheral surface, wherein the upper surface of the electrophoretic material layer is defined by a perimeter having a length and a width,
   a first adhesive layer having an upper surface, a lower surface, and a peripheral surface, wherein the upper surface of the first adhesive layer has a length and a width, wherein the upper surface of the first adhesive layer is in contact with the lower surface of the electrophoretic material layer, and wherein the lower surface of the first adhesive layer is in contact with the upper surface of the backplane;
   a second adhesive layer having an upper surface, a lower surface, and a peripheral surface, wherein the upper surface of the second adhesive layer has a length and a width, wherein the upper surface of the second adhesive layer is in contact with lower surface of the first light-transmissive layer and the lower surface of the second adhesive layer is in contact with the upper surface of the electrophoretic material layer;

a conductive edge seal;

wherein the length and width of the upper surface of the first light-transmissive electrode layer and the length and width of the upper surface of the backplane are larger than the length and width of the perimeter of the upper surface of the electrophoretic material layer, the length and width of the upper surface of the first adhesive layers, and the length and width of the upper surface of the second adhesive layer;

wherein the first light-transmissive electrode layer and the backplane extend outwardly beyond the edges of the perimeter of the upper surface of the electrophoretic material layer and the edges of the first and the second adhesive layers, forming a groove that is defined by the outwardly extended first light-transmissive electrode layer, the peripheral surface of the second adhesive layer, the peripheral surface of the electrophoretic material layer, the peripheral surface of the first adhesive layer, and the outwardly extended backplane;

wherein the groove is filled with the conductive edge seal;

wherein the conductive edge seal electrically connects the first light-transmissive electrode at the first electrode contact location and the second electrode layer at the second electrode contact location; and wherein at least part of the first electrode contact location and at least part of the second electrode contact location are outside the volume defined by a vertical extension of the perimeter of the upper surface of the electrophoretic material layer, resulting in the active display area of the device being substantially the same as the area of the upper surface of the electrophoretic material layer.

2. The electro-optic device of claim 1, wherein the groove has height of from about 20 μm to about 150 μm.

3. The electro-optic device of claim 1, wherein the groove has width of from about 0.3 mm to about 5 mm.

4. The electro-optic device of claim 1, wherein the electrophoretic medium is compartmentalized in microcapsules.

5. The electro-optic device of claim 1, wherein the electrophoretic medium is compartmentalized in microcells.

6. The electro-optic device of claim 1, wherein the conductive edge seal is formed by an edge seal composition comprising a polymer selected from the group consisting of polyurethane, epoxy resin, polydimethylsiloxane, polyacrylate, polymethacrylate, polycarbonate, polyvinyl chloride, polystyrene-alkylene copolymer, polyamide, polyester, polystyrene, polyethylene, polypropylene, polyisobutylene, poly(ethylene terephthalate), poly(ethylene naphthalate), and mixtures thereof.

7. The electro-optic device of claim 1, wherein the conductive edge seal is formed by an edge seal composition comprising conductive particles selected form the group consisting of carbon black particles, graphite, carbon nanotubes, metal particles, and mixtures thereof.

8. The electro-optic device of claim 1, wherein the conductive edge seal is formed by an edge seal composition comprising a conductive polymer.

9. The electro-optic device of claim 1, wherein the resistivity of the conductive edge seal is less than 10 kOhm·cm.

* * * * *